United States Patent
Hu

(10) Patent No.: US 12,206,277 B2
(45) Date of Patent: Jan. 21, 2025

(54) VEHICLE UNINTERRUPTIBLE POWER SUPPLY SYSTEM AND CONTROL METHOD THEREOF

(71) Applicant: Getac Technology Corporation, New Taipei (TW)

(72) Inventor: Chien-Chih Hu, Taipei (TW)

(73) Assignee: Getac Technology Corporation, New Taipei (TW)

(*) Notice: Subject to any disclaimer, the term of this patent is extended or adjusted under 35 U.S.C. 154(b) by 60 days.

(21) Appl. No.: 18/296,969

(22) Filed: Apr. 6, 2023

(65) Prior Publication Data

US 2024/0146098 A1 May 2, 2024

Related U.S. Application Data

(60) Provisional application No. 63/420,467, filed on Oct. 28, 2022.

(51) Int. Cl.
*H02J 9/06* (2006.01)
*B60L 3/00* (2019.01)
(Continued)

(52) U.S. Cl.
CPC ............ *H02J 7/342* (2020.01); *B60L 3/0046* (2013.01); *B60R 16/03* (2013.01); *B60R 16/033* (2013.01);
(Continued)

(58) Field of Classification Search
None
See application file for complete search history.

(56) References Cited

U.S. PATENT DOCUMENTS 9,347,414 B2 5/2016 Proebstle
10,910,875 B2 2/2021 Teng
(Continued)

FOREIGN PATENT DOCUMENTS

CN 111674346 A 9/2020
CN 214590746 U 11/2021
(Continued)

OTHER PUBLICATIONS

Search Report issued on Sep. 22, 2023 for EP application No. 23165005.2.

*Primary Examiner* — Jared Fureman
*Assistant Examiner* — Aqeel H Bukhari
(74) *Attorney, Agent, or Firm* — Li & Cai Intellectual Property Office

(57) ABSTRACT

A vehicle uninterruptible power supply system and a control method thereof are provided. The control method includes: instructing, by a control circuit, a charging and discharging circuit to use one of a vehicle power supply and a backup battery for charging a vehicle load according to a voltage of the vehicle power supply and a voltage of the backup battery when the control circuit receives an ignition-on signal; instructing, by the control circuit, the charging and discharging circuit to use one of the vehicle power supply and the backup battery for charging the vehicle load according to the voltage of the backup battery when the control circuit receives an ignition-off signal; and preventing, by the control circuit, the vehicle power supply and the backup battery from charging the vehicle load when the control circuit receives the ignition-off signal.

8 Claims, 5 Drawing Sheets

(51) Int. Cl.
  *B60R 16/03*  (2006.01)
  *B60R 16/033* (2006.01)
  *H02J 7/00*   (2006.01)
  *H02J 7/34*   (2006.01)

(52) U.S. Cl.
  CPC ........ *H02J 7/0047* (2013.01); *H02J 7/00712* (2020.01); *H02J 9/061* (2013.01); *H02J 7/0024* (2013.01); *H02J 7/007* (2013.01)

(56) References Cited

U.S. PATENT DOCUMENTS

| | | |
|---|---|---|
| 11,059,371 B2 | 7/2021 | Kageyama et al. |
| 2017/0197565 A1 | 7/2017 | Yoneyama et al. |
| 2018/0191185 A1 | 7/2018 | Al Rasheed et al. |
| 2020/0259363 A1 | 8/2020 | Fukae |
| 2021/0086655 A1 | 3/2021 | Li et al. |
| 2021/0237670 A1* | 8/2021 | Takahara .................. H02J 9/06 |
| 2022/0009376 A1 | 1/2022 | Kawai et al. |
| 2022/0026492 A1 | 1/2022 | Verheijen et al. |
| 2022/0089111 A1* | 3/2022 | Morita ...................... B60T 8/88 |
| 2022/0103007 A1* | 3/2022 | Shindo .............. H02J 7/007182 |
| 2022/0200311 A1* | 6/2022 | Oonishi .................. H02J 7/342 |
| 2022/0258647 A1 | 8/2022 | Joao |

FOREIGN PATENT DOCUMENTS

| | | |
|---|---|---|
| CN | 113859158 A | 12/2021 |
| CN | 115133620 A | 9/2022 |
| TW | M394254 U1 | 12/2010 |
| TW | M624892 U | 3/2022 |

\* cited by examiner

VEHICLE UNINTERRUPTIBLE POWER SUPPLY SYSTEM AND CONTROL METHOD THEREOF

CROSS-REFERENCE TO RELATED PATENT APPLICATION

This application claims the benefit of priority to the U.S. Provisional Patent Application Ser. No. 63/420,467, filed on Oct. 28, 2022, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a power management system and a power management method thereof, and more particularly to a vehicle uninterruptible power supply system and a control method thereof.

BACKGROUND OF THE DISCLOSURE

When an engine of a vehicle is turned off, as long as a vehicle ignition is turned on, a vehicle power supply can still provide power to a vehicle load for operation. Conversely, when the engine and the vehicle ignition are turned off, the vehicle power supply will stop supplying the power to the vehicle load.

In certain particular situations, e.g., where a police car of an on-duty police officer is parked on a side of a road, in order to keep a digital image recorder installed in the police car running, the police officer usually turns off the engine, but does not turn off the vehicle ignition. However, since power consumption of the digital video recorder is large, if a driver does not pay attention to the remaining power of the vehicle power supply, the power of the vehicle power supply can be easily exhausted to the extent that the engine cannot be started again.

SUMMARY OF THE DISCLOSURE

In response to the above-referenced technical inadequacies, the present disclosure provides a vehicle uninterruptible power supply system and a control method thereof.

In order to solve the above-mentioned problems, one of the technical aspects adopted by the present disclosure is to provide a vehicle uninterruptible power supply system. The vehicle uninterruptible power supply system is adapted to a vehicle load and a vehicle power supply. The vehicle uninterruptible power supply system includes a control circuit, a charging and discharging circuit, and a backup battery. The control circuit is connected to the vehicle power supply and the vehicle load. The charging and discharging circuit is connected to the control circuit, and the backup battery is connected to the charging and discharging circuit and the control circuit. When the control circuit receives an ignition-on signal, the control circuit instructs the charging and discharging circuit to use one of the vehicle power supply and the backup battery for charging the vehicle load according to a voltage of the vehicle power supply and a voltage of the backup battery.

In order to solve the above-mentioned problems, another one of the technical aspects adopted by the present disclosure is to provide a control method of a vehicle uninterruptible power supply system. The control method includes: instructing, by a control circuit, a charging and discharging circuit to use one of a vehicle power supply and a backup battery for charging a vehicle load according to a voltage of the vehicle power supply and a voltage of the backup battery when the control circuit receives an ignition-on signal; instructing, by the control circuit, the charging and discharging circuit to use one of the vehicle power supply and the backup battery for charging the vehicle load according to the voltage of the backup battery when the control circuit receives an ignition-off signal; and preventing, by the control circuit, the vehicle power supply and the backup battery from charging the vehicle load when the control circuit receives the ignition-off signal and after the charging and discharging circuit uses one of the vehicle power supply and the backup battery to charge the vehicle load.

Therefore, in the vehicle uninterruptible power supply system and the control method thereof provided by the present disclosure, time points at which the vehicle power supply and the backup battery charge and do not charge the vehicle load can be controlled in a programmable manner. Accordingly, power of the vehicle power supply can be prevented from being consumed by the vehicle load, so that the power of the vehicle power supply is sufficient for starting the engine again.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
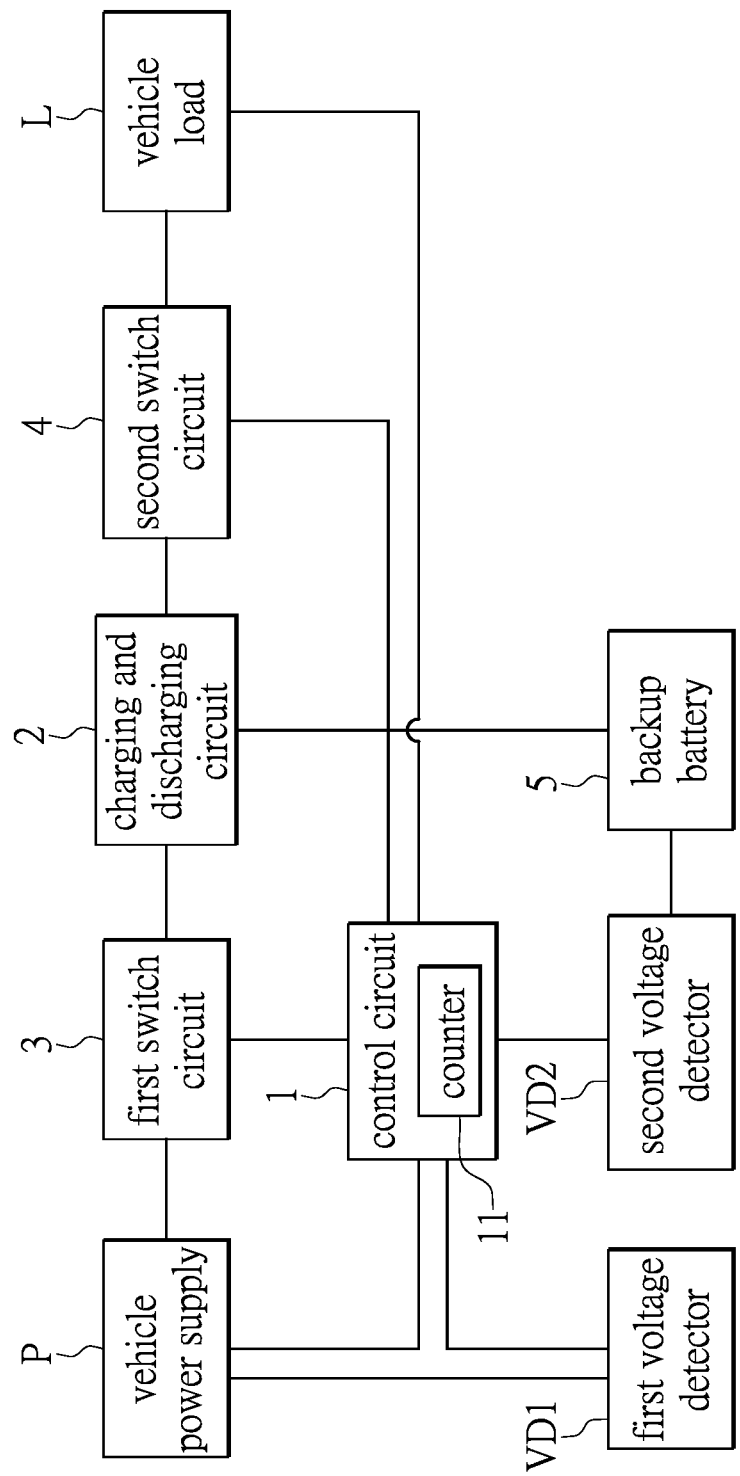
FIG. 1 is a functional block diagram of a vehicle uninterruptible power supply system according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like. In addition, the term "connect" in the context of the present disclosure means that there is a physical connection between two elements, and the two elements are directly or indirectly connected.

FIG. 1 is a functional block diagram of a vehicle uninterruptible power supply system according to a first embodiment of the present disclosure. Referring to FIG. 1, the vehicle uninterruptible power supply system is adapted to a vehicle power supply P and a vehicle load L. The vehicle uninterruptible power supply system includes, for example, a control circuit 1, a charging and discharging circuit 2, a first switch circuit 3, a second switch circuit 4, a backup battery 5, a first voltage detector VD1, and a second voltage detector VD2, but is not limited thereto.

The control circuit 1 is connected to the vehicle power supply P, the vehicle load L, the charging and discharging circuit 2, the first switch circuit 3, the second switch circuit 4, the first voltage detector VD1, and the second voltage detector VD2. The charging and discharging circuit 2 is further connected to the first switch circuit 3, the second switch circuit 4, and the backup battery 5. The first switch circuit 3 is further connected to the vehicle power supply P. The second switch circuit 4 is further connected to the charging and discharging circuit 2 and the vehicle load L. The first voltage detector VD1 is connected to the vehicle power supply P, and the second voltage detector VD2 is connected to the backup battery 5.

When a vehicle ignition that is in an off state is turned on, the control circuit 1 receives an ignition-on signal. Next, the control circuit 1 obtains a voltage of the vehicle power supply P by the first voltage detector VD1, and determines whether or not the voltage of the vehicle power supply P is less than a first voltage threshold (e.g., 12 volts). When the voltage of the vehicle power supply P is not less than the first voltage threshold, the control circuit 1 instructs the charging and discharging circuit 2 to use the vehicle power supply P to charge the vehicle load L. At this time, the charging and discharging circuit 2 does not use the backup battery 5 for charging the vehicle load L. When the voltage of the vehicle power supply P is less than the first voltage threshold, the control circuit 1 controls the first switch circuit 3 to be in the off state, so as to prevent the vehicle power supply P from charging the vehicle load L.

Moreover, when the voltage of the vehicle power supply P is less than the first voltage threshold, the control circuit 1 further obtains a voltage of the backup battery 5 by the second voltage detector VD2, and determines whether or not the voltage of the backup battery 5 is less than a second voltage threshold (e.g., 9.8 volts). When the voltage of the backup battery 5 is less than the second voltage threshold, the control circuit 1 controls the second switch circuit 4 to be in the off state, so as to prevent the backup battery 5 from charging the vehicle load L. When the voltage of the backup battery 5 is not less than the second voltage threshold, the control circuit 1 instructs the charging and discharging circuit 2 to use the backup battery 5 for charging the vehicle load L. At this time, the charging and discharging circuit 2 does not use the vehicle power supply P to charge the vehicle load L.

When the vehicle ignition that is in an on state is turned off, the control circuit 1 receives an ignition-off signal. When the vehicle power supply P is used to charge the vehicle load L and the control circuit 1 receives the ignition-off signal, the counter 11 of the control circuit 1 is activated to start counting. Before a counting time of the counter 11 reaches a first time threshold and when the charging and discharging circuit 2 is using the vehicle power supply P to charge the backup battery 5, the control circuit 1 instructs the charging and discharging circuit 2 to stop using the vehicle power supply P for charging the backup battery 5.

When the counting time of the counter 11 reaches the first time threshold (e.g., 5 minutes) and does not reach the second time threshold (e.g., 10 minutes), the control circuit 1 determines whether or not the voltage of the backup battery 5 is less than the second voltage threshold. When the voltage of the backup battery 5 is less than the second voltage threshold, the control circuit 1 instructs the charging and discharging circuit 2 to use the vehicle power supply P for charging the vehicle load L. At this time, the charging and discharging circuit 2 does not use the backup battery 5 to charge the vehicle load L. Conversely, when the voltage of the backup battery 5 is not less than the second voltage threshold, the control circuit 1 instructs the charging and discharging circuit 2 to use the backup battery 5 for charging the vehicle load P. At this time, the charging and discharging circuit 2 does not use the vehicle power supply P to charge the vehicle load L.

When the counting time reaches the second time threshold and does not reach a third time threshold (e.g., 15 minutes), the control circuit 1 outputs the ignition-off signal to the vehicle load L. When the counting time reaches the third time threshold, the control circuit 1 controls the first switch circuit 3 and the second switch circuit 4 to be in the off state, so as to prevent the vehicle power supply P and the backup battery 5 from charging the vehicle load L.

Figure 2:
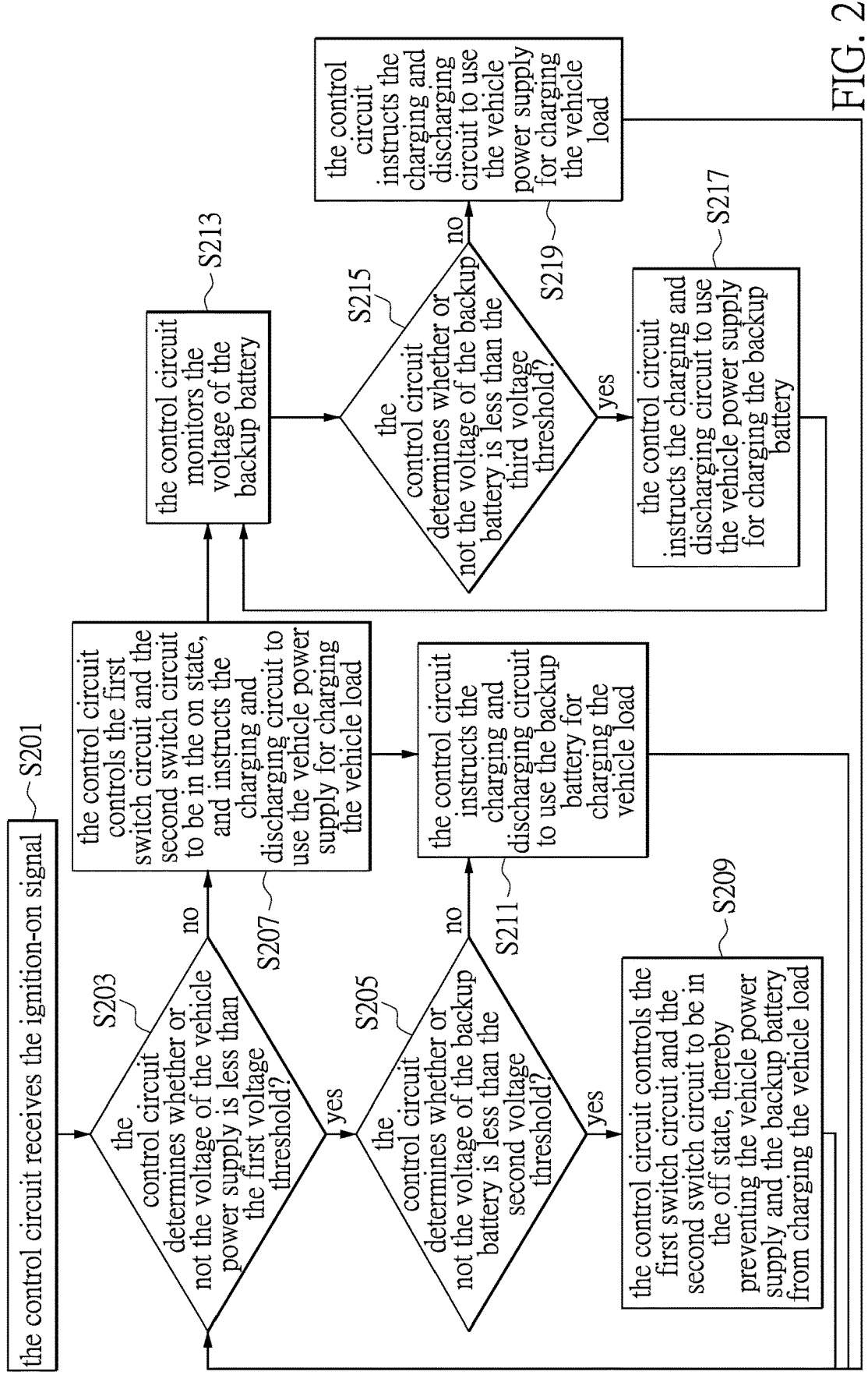
FIG. 2 is a flowchart illustrating one example of a control method when an ignition-on event occurs to the vehicle uninterruptible power supply system of FIG. 1.

FIG. 2 is a flowchart illustrating one example of a control method when an ignition-on event occurs to the vehicle uninterruptible power supply system of FIG. 1. Referring to FIG. 2, in step S201, the control circuit 1 receives the ignition-on signal. Specifically, when the first switch circuit 3 and the second switch circuit 4 are in the off state and the vehicle ignition that is in the off state is turned on, the control circuit 1 receives the ignition-on signal from the vehicle power supply P.

In step S203, the control circuit 1 determines whether or not the voltage of the vehicle power supply P is less than the first voltage threshold (e.g., 12 volts). If the voltage of the vehicle power supply P is less than the first voltage threshold, step S203 is followed by step S205. If the voltage of the vehicle power supply P is not less than the first voltage threshold, step S203 is followed by step S207. In step S205, the control circuit 1 determines whether or not the voltage of the backup battery 5 is less than the second voltage threshold (e.g., 9.8 volts). In step S207, the control circuit 1 controls the first switch circuit 3 and the second switch circuit 4 to be in the on state, and instructs the charging and discharging circuit 2 to use the vehicle power supply P for charging the vehicle load L. At this time, the charging and discharging circuit 2 does not use the backup battery 5 to charge the vehicle load L.

In step S205, when the voltage of the backup battery 5 is less than the second voltage threshold, step S205 is followed by step S209. When the voltage of the backup battery 5 is not less than the second voltage threshold, step S205 is followed by step S211. In step S209, the control circuit 1 controls the first switch circuit 3 and the second switch circuit 4 to be in the off state, thereby preventing the vehicle power supply P and the backup battery 5 from charging the vehicle load L. After step S209, the control method returns to step S203.

In step S211, the control circuit 1 instructs the charging and discharging circuit 2 to use the backup battery 5 for charging the vehicle load L. At this time, the charging and discharging circuit 2 does not use the vehicle power supply P to charge the vehicle load L. After step S211, the control method returns to step S203.

Step S207 is followed by step S213. In step S213, the control circuit 1 monitors the voltage of the backup battery 5. Step S213 is followed by step S215. In step S215, the control circuit 1 determines whether or not the voltage of the backup battery 5 is less than the third voltage threshold (e.g., 14.7 volts). If the voltage of the backup battery 5 is less than the third voltage threshold, step S215 is followed by step S217. If the voltage of the backup battery 5 is not less than the third voltage threshold, step S215 is followed by step S219. In step S217, the control circuit 1 instructs the charging and discharging circuit 2 to use the vehicle power supply P for charging the backup battery 5. After step S217, the control method returns to step S213. In step S219, the control circuit 1 instructs the charging and discharging circuit 2 to use the vehicle power supply P for charging the vehicle load L. At this time, the charging and discharging circuit 2 does not use the backup battery 5 to charge the vehicle load L. After step S219, the control method returns to step S203.

Specifically, when the vehicle ignition is turned on, the vehicle uninterruptible power supply system monitors the voltage of the vehicle power supply P and the voltage of the backup battery 5. According to whether or not the voltage of the vehicle power supply P and the voltage of the backup battery 5 reach a preset voltage threshold, the vehicle uninterruptible power supply system uses the vehicle power supply P or the backup battery 5 to charge the vehicle load L. In this way, in addition to protecting the vehicle power supply P and the backup battery 5, the vehicle load L can continuously obtain power required for operation.

Figure 3:
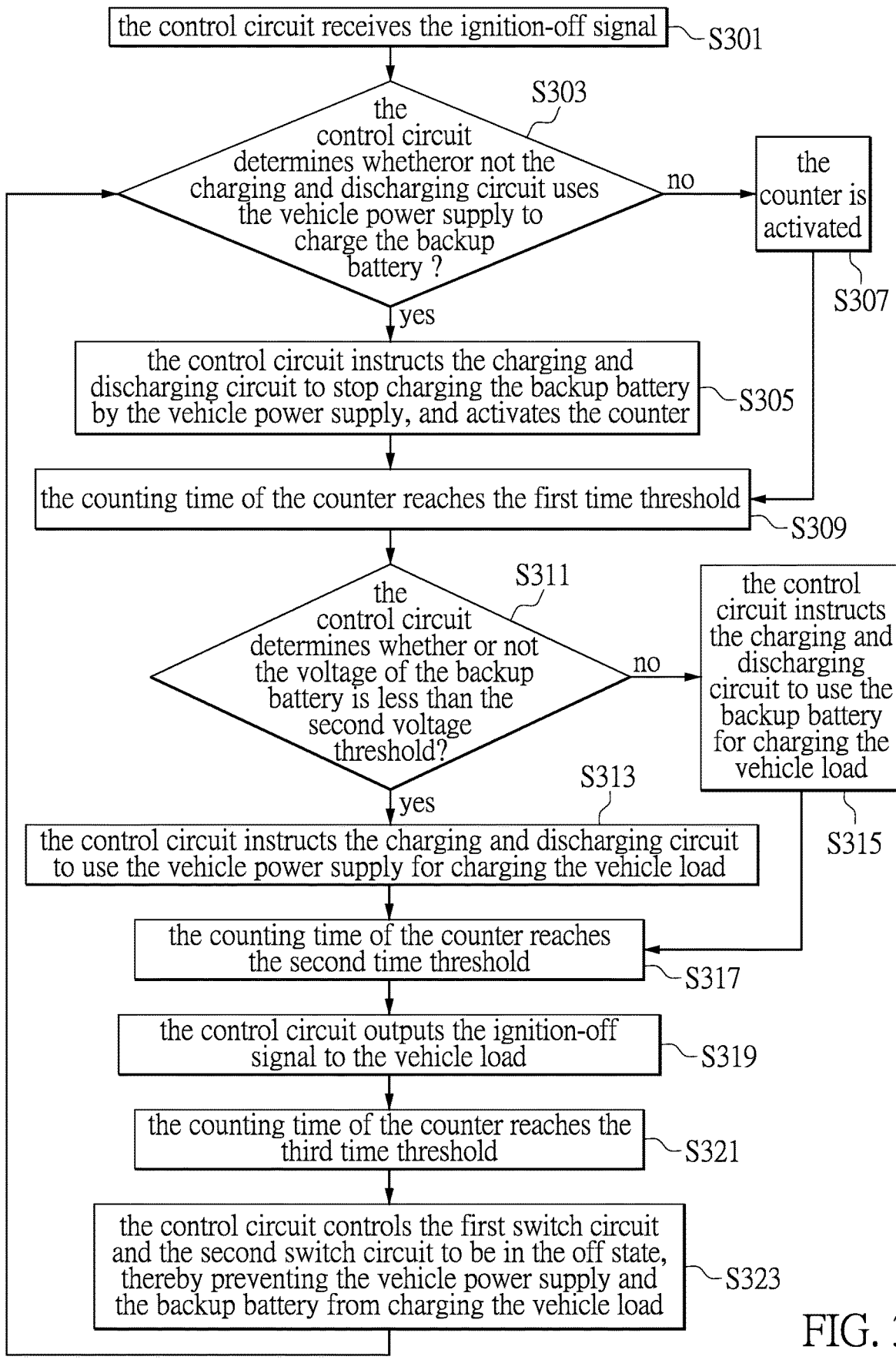
FIG. 3 is a flowchart illustrating one example of the control method when an ignition-off event occurs to the vehicle uninterruptible power supply system of FIG. 1.

FIG. 3 is a flowchart illustrating one example of the control method when an ignition-off event occurs to the vehicle uninterruptible power supply system of FIG. 1. Referring to FIG. 3, in step S301, the control circuit 1 receives the ignition-off signal. Specifically, when the vehicle power supply P is used to charge the vehicle load L and the vehicle ignition that is in the on state is turned off, the control circuit 1 receives the ignition-off signal from the vehicle power supply P.

In step S303, the control circuit 1 determines whether or not the charging and discharging circuit 2 uses the vehicle power supply P to charge the backup battery 5. If the charging and discharging circuit 2 uses the vehicle power supply P to charge the backup battery 5, step S303 is followed by step S305. If the charging and discharging circuit 2 does not use the vehicle power supply P to charge the backup battery 5, step S303 is followed by step S307. In step S305, the control circuit 1 instructs the charging and discharging circuit 2 to stop charging the backup battery 5 by the vehicle power supply P, and activates the counter 11.

In step S307, the counter 11 is activated.

After step S305 and step S307, the control method proceeds to step S309. In step S309, the counting time of the counter 11 reaches the first time threshold. In step S311, the control circuit 1 determines whether or not the voltage of the backup battery 5 is less than the second voltage threshold. The second time threshold is greater than the first time threshold. If the voltage of the backup battery 5 is less than the second voltage threshold, step S311 is followed by step S313. If the voltage of the backup battery 5 is not less than the second voltage threshold, step S311 is followed by step S315. In step S313, the control circuit 1 instructs the charging and discharging circuit 2 to use the vehicle power supply P for charging the vehicle load L. At this time, the charging and discharging circuit 2 does not use the backup battery 5 to charge the vehicle load L. In step S315, the control circuit 1 instructs the charging and discharging circuit 2 to use the backup battery 5 for charging the vehicle load L. At this time, the charging and discharging circuit 2 does not use the vehicle power supply P to charge the vehicle load L.

After step S313 and step S315, the control method proceeds to step S317. In step S317, the counting time of the counter 11 reaches the second time threshold. Step S317 is followed by step S319. In step S319, the control circuit 1 outputs the ignition-off signal to the vehicle load L. In step S321, the counting time of the counter 11 reaches the third time threshold. The third time threshold is greater than the second time threshold. In step S323, the control circuit 1 controls the first switch circuit 3 and the second switch circuit 4 to be in the off state, thereby preventing the vehicle power supply P and the backup battery 5 from charging the vehicle load L. After step S323, the control method returns to step S303.

Specifically, when the vehicle ignition is turned off, the vehicle uninterruptible power supply system does not immediately prevent the vehicle power supply P and the backup battery 5 from charging the vehicle load L. Firstly, charging of the backup battery 5 is stopped. Then, the vehicle load L is notified of the ignition-off event. After the vehicle load L learns that the vehicle ignition is turned off, the vehicle uninterruptible power supply system completely stops the vehicle power supply P and the backup battery 5 from charging the vehicle load L.

Figure 4:
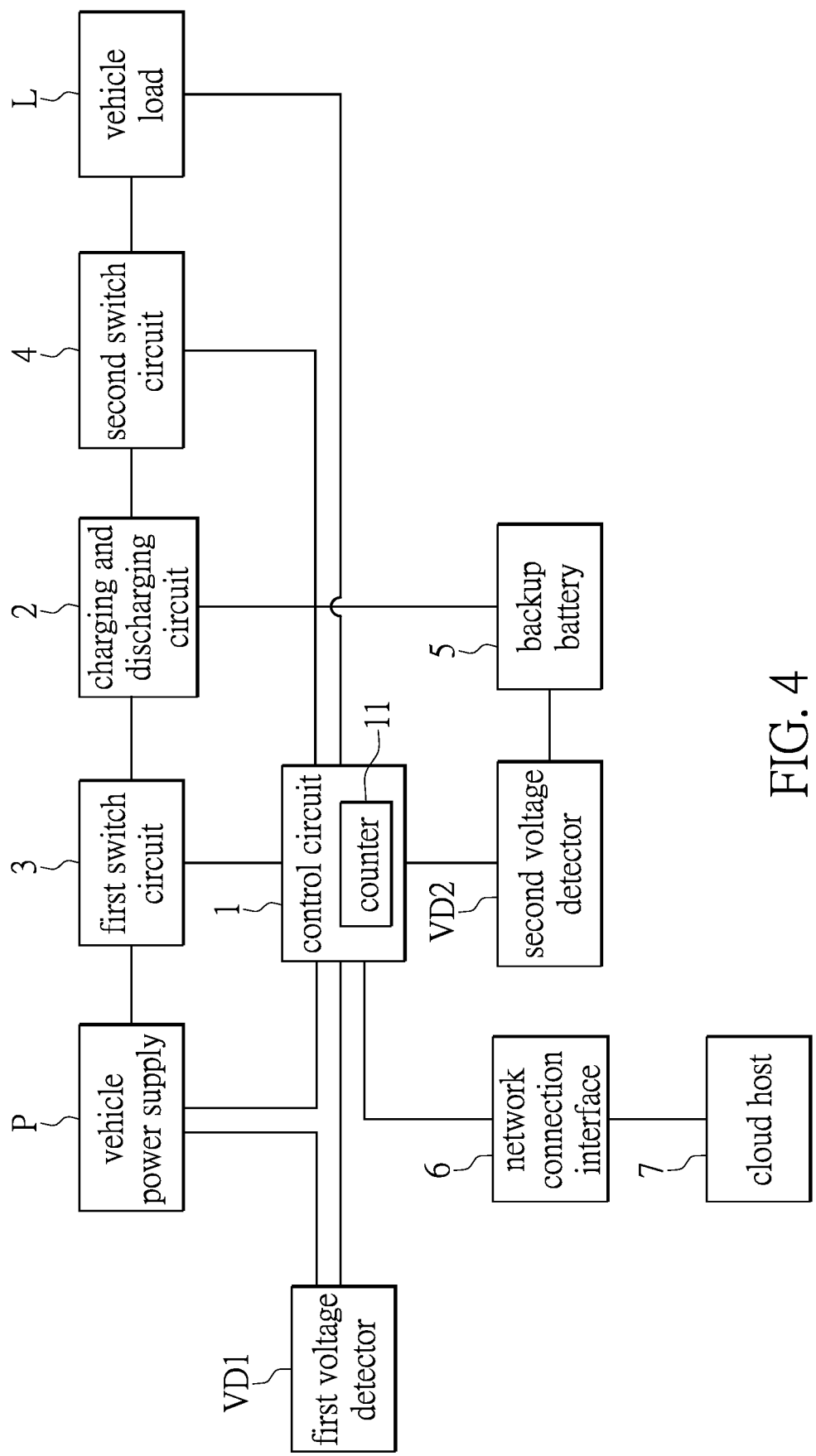
FIG. 4 is a functional block diagram of the vehicle uninterruptible power supply system according to a second embodiment of the present disclosure.

FIG. 4 is a functional block diagram of the vehicle uninterruptible power supply system according to a second embodiment of the present disclosure. Compared with the vehicle uninterruptible power supply system of FIG. 1, the vehicle uninterruptible power supply system of FIG. 4 further includes a network connection interface 6 and a cloud host 7. The network connection interface 6 can be, for example, a wired network interface or a wireless network interface. The network connection interface 6 is connected to the control circuit 1. The control circuit 1 is network-connected to the cloud host 7 by the network connection interface 6. The cloud host 7 receives input commands to adjust multiple parameters of the vehicle uninterruptible power supply system, and these parameters at least include the first voltage threshold, the second voltage threshold, the third voltage threshold, the first time threshold, the second time threshold, and the third time threshold. Therefore, according to practical requirements, users can remotely adjust the parameters of the vehicle uninterruptible power supply system. In addition, the control circuit 1 periodically reports voltage states and current states of the vehicle power supply P, the backup battery 5, and the vehicle load L to the cloud host 7. For example, the control circuit 1 reports voltage states and current states of the vehicle power supply P, the backup battery 5, and the vehicle load L to the cloud host 7 every one second.

Figure 5:
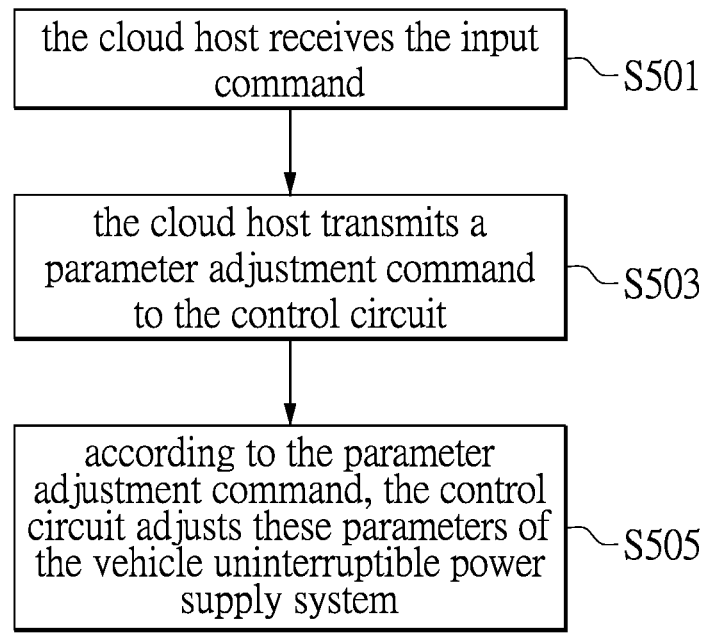
FIG. 5 is a flowchart illustrating remote parameter configuration of the vehicle uninterruptible power supply system of FIG. 4.

FIG. 5 is a flowchart illustrating remote parameter configuration of the vehicle uninterruptible power supply system of FIG. 4. Referring to FIG. 5, in step S501, the cloud host 7 receives the input command. In step S503, the cloud host 7 transmits a parameter adjustment command to the control circuit 1. The parameter adjustment command includes, for example, adjusting the first voltage threshold, the second voltage threshold, the third voltage threshold, the first time threshold, the second time threshold, and the third time threshold. However, the present disclosure is not limited thereto. In step S505, according to the parameter adjustment command, the control circuit 1 adjusts these parameters of the vehicle uninterruptible power supply system.

BENEFICIAL EFFECTS OF THE EMBODIMENTS

In conclusion, in the vehicle uninterruptible power supply system and the control method thereof provided by the present disclosure, time points at which the vehicle power supply and the backup battery charge and do not charge the vehicle load can be controlled in a programmable manner. Accordingly, power of the vehicle power supply can be prevented from being consumed by the vehicle load, so that the power of the vehicle power supply is sufficient for starting the engine again.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A vehicle uninterruptible power supply system, which is adapted to a vehicle load and a vehicle power supply, the vehicle uninterruptible power supply system comprising:
    a control circuit connected to the vehicle power supply and the vehicle load;
    a charging and discharging circuit connected to the control circuit; and
    a backup battery connected to the charging and discharging circuit and the control circuit;
    wherein, when the control circuit receives an ignition-on signal, the control circuit instructs the charging and discharging circuit to use one of the vehicle power supply and the backup battery for charging the vehicle load according to a voltage of the vehicle power supply and a voltage of the backup battery;
    wherein the control circuit includes a counter, and the counter is activated when the control circuit receives an ignition-off signal;
    wherein, when a counting time of the counter reaches a first time threshold, the control circuit determines whether or not the voltage of the backup battery is less a second voltage threshold;
    wherein, when the voltage of the backup battery is less than the second voltage threshold, the charging and discharging circuit uses the vehicle power supply to charge the vehicle load;
    wherein, when the voltage of the backup battery is not less than the second voltage threshold, the charging and discharging circuit uses the backup battery to charge the vehicle load;
    wherein, when the counting time reaches a second time threshold, the control circuit outputs the ignition-off signal to the vehicle load;
    wherein, when the counting time reaches a third time threshold, the charging and discharging circuit stops using the backup battery to charge the vehicle load.

2. The vehicle uninterruptible power supply system according to claim 1, wherein, when the vehicle power supply is used to charge the vehicle load, the control circuit determines whether or not the voltage of the backup battery is less than a third voltage threshold; wherein, when the voltage of the backup battery is less than the third voltage threshold, the charging and discharging circuit charges the backup battery; wherein, when the voltage of the backup battery is not less than the third voltage threshold, the charging and discharging circuit uses the vehicle power supply to charge the vehicle load.

3. The vehicle uninterruptible power supply system according to claim 1, further comprising a network connection interface and a cloud host; wherein the network connection interface is connected to the control circuit, the control circuit is connected to the cloud host by the network connection interface, and the cloud host is configured to set a first voltage threshold, the second voltage threshold, the first time threshold, the second time threshold, and the third time threshold.

4. A control method of a vehicle uninterruptible power supply system, comprising:
    instructing, by a control circuit, a charging and discharging circuit to use one of a vehicle power supply and a backup battery for charging a vehicle load according to a voltage of the vehicle power supply and a voltage of the backup battery when the control circuit receives an ignition-on signal;
    instructing, by the control circuit, the charging and discharging circuit to use one of the vehicle power supply and the backup battery for charging the vehicle load according to the voltage of the backup battery when the control circuit receives an ignition-off signal; and
    preventing, by the control circuit, the vehicle power supply and the backup battery from charging the vehicle load when the control circuit receives the ignition-off signal and after the charging and discharging circuit uses one of the vehicle power supply and the backup battery to charge the vehicle load.

5. The control method according to claim 4, wherein, when the control circuit receives the ignition-on signal, the control circuit determines whether or not the voltage of the vehicle power supply is less than a first voltage threshold; wherein, when the voltage of the vehicle power supply is not less than the first voltage threshold, the charging and discharging circuit uses the vehicle power supply to charge the vehicle load; wherein, when the voltage of the vehicle power supply is less than the first voltage threshold, the control circuit determines whether or not the voltage of the backup battery is less than a second voltage threshold; wherein, when the voltage of the backup battery is less than the second voltage threshold, the charging and discharging circuit stops using the backup battery to charge the vehicle load; wherein, when the voltage of the backup battery is not less than the second voltage threshold, the charging and discharging circuit uses the backup battery to charge the vehicle load.

6. The control method according to claim 4, wherein, when the control circuit receives the ignition-off signal, a counter of the control circuit is activated; wherein, when a counting time of the counter reaches a first time threshold, the control circuit determines whether or not the voltage of the backup battery is less than a second voltage threshold; wherein, when the voltage of the backup battery is less than the second voltage threshold, the vehicle power supply is used to charge the vehicle load; wherein, when the counting time reaches a second time threshold, the control circuit outputs the ignition-off signal to the vehicle load; wherein, when the counting time reaches a third time threshold, the control circuit prevents the vehicle power supply and the backup battery from charging the vehicle load.

7. The control method according to claim 5, further comprising: determining, by the control circuit, whether or not the voltage of the backup battery is less than a third voltage threshold when the vehicle power supply is used to charge the vehicle load; wherein, when the voltage of the backup battery is less than the third voltage threshold, the backup battery starts to be charged; wherein, when the voltage of the backup battery is not less than the third voltage threshold, the vehicle power supply is used to charge the vehicle load.

8. The control method according to claim 6, further comprising: network-connecting, by a cloud host, to the control circuit; wherein at least a first voltage threshold, the second voltage threshold, the first time threshold, the second time threshold, and the third time threshold are set by the cloud host.

* * * * *